United States Patent
Barriere et al.

(10) Patent No.: US 12,195,920 B2
(45) Date of Patent: Jan. 14, 2025

(54) PROCESS FOR MANUFACTURING PAPER OR CARDBOARD

(71) Applicant: SNF GROUP, Andrezieux Boutheon (FR)

(72) Inventors: Cyril Barriere, Andrezieux Boutheon (FR); Rémi Olivier, Andrezieux Boutheon (FR); René Hund, Andrezieux Boutheon (FR)

(73) Assignee: SNF GROUP, Andrezieux Boutheon (FR)

( * ) Notice: Subject to any disclaimer, the term of this patent is extended or adjusted under 35 U.S.C. 154(b) by 254 days.

(21) Appl. No.: 17/619,145

(22) PCT Filed: May 7, 2020

(86) PCT No.: PCT/FR2020/050759
§ 371 (c)(1),
(2) Date: Dec. 14, 2021

(87) PCT Pub. No.: WO2020/260779
PCT Pub. Date: Dec. 30, 2020

(65) Prior Publication Data
US 2022/0356650 A1   Nov. 10, 2022

(30) Foreign Application Priority Data

Jun. 27, 2019  (FR) ..................................... 1907062

(51) Int. Cl.
*D21H 17/45* (2006.01)
*D21H 17/43* (2006.01)
*D21H 17/66* (2006.01)
*D21H 21/10* (2006.01)

(52) U.S. Cl.
CPC ........... *D21H 17/455* (2013.01); *D21H 17/43* (2013.01); *D21H 17/66* (2013.01); *D21H 21/10* (2013.01)

(58) Field of Classification Search
CPC ...... D21H 17/455; D21H 17/43; D21H 17/66; D21H 21/10
See application file for complete search history.

(56) References Cited

U.S. PATENT DOCUMENTS

| | | | | |
|---|---|---|---|---|
| 6,147,176 A | * | 11/2000 | Neff | B01D 21/01 |
| | | | | 526/306 |
| 2006/0201645 A1 | * | 9/2006 | Ito | D21H 21/16 |
| | | | | 162/158 |
| 2012/0101194 A1 | * | 4/2012 | Broecher | C08F 265/04 |
| | | | | 524/35 |
| 2015/0345081 A1 | * | 12/2015 | Gray | D21H 17/74 |
| | | | | 162/168.3 |
| 2016/0355980 A1 | * | 12/2016 | Kien | D21H 21/22 |
| 2017/0284028 A1 | * | 10/2017 | Hietaniemi | D21H 11/14 |
| 2018/0105987 A1 | * | 4/2018 | Lu | D21H 21/18 |
| 2018/0194906 A1 | * | 7/2018 | Carceller | D21H 21/10 |

FOREIGN PATENT DOCUMENTS

| | | |
|---|---|---|
| EP | 0331047 A1 | 9/1989 |
| WO | WO 2007/001473 A1 | 1/2007 |
| WO | WO 2012/065951 A1 | 5/2012 |

OTHER PUBLICATIONS

International Search Report (and English Translation) and Written Opinion for PCT/FR2020/050759, mailed Sep. 11, 2020.
Griffin WC, *Classification of Surface-Active Agents by HLB*, Journal of the Society of Cosmetic Chemists, 1949, 1, pp. 311-326.

* cited by examiner

*Primary Examiner* — Jacob T Minskey
*Assistant Examiner* — Stephen M Russell
(74) *Attorney, Agent, or Firm* — HESLIN ROTHENBERG FARLEY & MESITI P.C.

(57) ABSTRACT

This invention relates to a method for manufacturing a sheet of paper or cardboard, according to which, before forming said sheet, at least one N-vinylformamide polymer that is partially hydrolyzed in the form of an inverse emulsion is added, at one or more injection points, to a fibrous suspension in the presence of an anti-gelling agent, and having a cationic regain between 30 and 150%, the inverse emulsion having a weight ratio of partially hydrolyzed N-vinylformamide polymer to anti-gelling agent in the range between 1,000,000/5000 and 1,000,000/50,000.

18 Claims, No Drawings

PROCESS FOR MANUFACTURING PAPER OR CARDBOARD

CROSS REFERENCE TO RELATED APPLICATIONS

This application is a national stage filing under section 371 of International Application No. PCT/FR2020/050759, filed on May 7, 2020, and published on Dec. 30, 2020 as WO 2020/260779, which claims priority to French Application No. 1907062, filed on Jun. 27, 2019. The entire contents of WO 2020/260779 are hereby incorporated herein by reference.

FIELD OF THE INVENTION

This invention relates to a process for manufacturing paper or cardboard with improved total retention, filler retention, and drainage properties. More specifically, the invention has as its subject-matter a manufacturing process using a N-vinylformamide polymer partially hydrolyzed in the form of an inverse emulsion.

The subject-matter is also the paper or cardboard obtained by this process.

PRIOR ART

Implementation of retention and drainage systems is well known in paper-making processes.

By retention properties, we mean the ability to retain the suspended materials of the pulp (fibers, fines, fillers (calcium carbonate, titanium oxide), . . . ) on the forming fabric, thus in the fibrous mat that constitutes the final sheet. The mode of action of the retention agents is based on the flocculation of these suspended materials in water. Indeed, the flocs formed are more easily retained on the forming fabric.

Filler retention consists of specific retention of fillers (small mineral species with little affinity to cellulose). The significant improvement of filler retention leads to clarifying the white water by retaining the filler in the paper sheet and increasing its grammage. It also makes it possible to substitute part of the fibers (the most expensive species in the composition of the paper) with fillers (lower costs) to reduce the manufacturing costs of the paper.

As far as drainage properties are concerned, this refers to the capacity of the fibrous mat to evacuate or drain as much water as possible so that the sheet dries as quickly as possible, especially during the manufacture of the sheet.

Since these two properties (retention and drainage) are closely linked, in that one depends upon the other, it is then a question of finding the best compromise between retention and drainage. Generally speaking, the person skilled in the art refers to a retention and drainage agent because these are the same types of products that improve these two properties.

All retention and drainage systems known in the prior art are characterized by the fact that they have as their main retention agent water-soluble polymers of high molecular weight, higher than 1 million g/mol, generally higher than 3 million g/mol, called flocculants. Due to their high molecular weight, they are generally cationic and have the particularity to be in the form of an emulsion (inverse), microemulsion, powder, or dispersion. These polymers are generally introduced at 50 to 800 g/t of dry polymer to dry paper.

The points of introduction of these agents in the paper process are generally located in the short circuit, that is to say, after the mixing pump (or Fan Pump), and thus in the diluted pulp (or Thin Stock) whose concentration is generally lower than 1% in weight of dry matter, most often between 0.5 and 1.2%. Polyvinylamines are commonly used as drainage agents. In general, polyvinyl amines are obtained either by the Hofmann degradation of polyacrylamides or by hydrolysis of a polyvinyl formamide. The hydrolysis of polyvinyl formamides consists of generating a vinylamine function from an N-vinylformamide function. Hydrolysis may be carried out in an acid or basic medium. The amount of acid or base determines the rate of hydrolysis and thus the amount of vinylamine present in the final polymer. Polyvinylamines are mainly obtained by hydrolysis of polyvinyl formamides in aqueous solutions. The objective is to obtain linear and high molecular weight polyvinyl amines with optimal retention and drainage properties for use in a paper process.

Specification

Surprisingly, the Applicant has discovered that a paper-making process using at least one N-vinylformamide polymer partially hydrolyzed in the form of an inverse emulsion and having a cationic regain of between 30 and 150% provides improved drainage, fiber, and fines retention, and filler retention performance.

More precisely, the invention relates to a process for manufacturing a sheet of paper or cardboard according to which at least one N-vinylformamide polymer partially hydrolyzed in the form of an inverse emulsion and having a cationic regain of between 30 and 150% is added before the formation of the said sheet to a fibrous suspension at one or more injection points.

In the following description and in the claims, all-polymer dosages expressed in $g \cdot t^{-1}$ are given as the weight of polymer per ton of dry pulp. Thus, according to the invention, the dry pulp corresponds to the dry weight of the fibrous suspension used in the process.

In the context of the invention, a paper-making process corresponds to a process for manufacturing paper, cardboard, or the like, in particular, a process for producing a sheet of paper, cardboard, or the like.

Prior to the formation of said sheet, at least one N-vinylformamide polymer partially hydrolyzed in the form of an inverse emulsion according to the invention is added to the fibrous suspension at one or more injection points.

The term fibrous suspension is understood as the slurry or diluted pulp based on water and cellulose fibers. The Thick Stock, with a dry matter concentration (by weight) of more than 1% or even more than 3%, is upstream of the fan pump. The Thin Stock, with a dry matter concentration (by weight) generally below 1%, is located downstream of the mixing pump.

The polymer may be introduced in the thick stock or the thin stock. It may be added to the fan pump or the headbox. Preferably, the copolymer is introduced before the headbox.

The term "polymer" refers to homopolymers of N-vinylformamide and copolymers with non-ionic monomers and/or anionic monomers and/or cationic monomers and/or zwitterionic monomers polymerizable with N-vinylformamide.

As examples of anionic monomers, it is advantageous to use at least one monomer selected from:
monomers comprising at least one carboxylic function, for example, acrylic acid, methacrylic acid, itaconic acid, and the salts thereof;
monomers comprising at least one sulfonic acid function, for example, 2-acrylamido-2-methylpropane sulfonic acid (AMPS), allyl sulfonic acid, and methallyl sulfonic acid and the salts thereof.

The anionic monomer salts are generally alkali metal, alkaline earth, or ammonium salts, preferably sodium or potassium salts.

As examples of non-ionic monomers, it is advantageous to use at least one monomer selected from:

acrylamide and its derivatives, including N-alkylacrylamides, e.g., N-isopropylacrylamide, N-tert-butylacrylamide; N,N-dialkylacrylamides, e.g. N,N-dimethylacrylamide; and N-methylolacrylamide;

methacrylamide and its derivatives, including N-alkylmethacrylamides, e.g., N-isopropylmethacrylamide, N-tert-butylmethacrylamide; N,N-dialkylmethacrylamides, e.g., N,N-dimethylmethacrylamide; and N-methylolmethacrylamide;

N-vinylpyridine, N-vinylpyrrolidone, hydroxyalkylacrylates, hydroxyalkyl methacrylates, acrylates bearing alkoxy chains, and methacrylates bearing alkoxy chains.

As examples of anionic monomers, it is advantageous to use at least one monomer selected from:

diallyldialkyl ammonium salts, for example, diallyl dimethyl ammonium halide (DADMAC) chloride;

dialkylaminoalkyl acrylates, dialkylaminoalkyl methacrylates, in particular, dialkylaminoalkyl dialkylaminoethyl acrylate (ADAME) and dialkylaminoethyl methacrylate (MADAME), as well as their acidified or quaternized forms, e.g., [2-(acryloyloxy)ethyl]trimethylammonium chloride; dialkyl-aminoalkylacrylamides, dialkyl-methacrylamides, as well as their acidified or quaternized forms, for example, acrylamido-propyl trimethyl ammonium chloride.

The quaternization of monomers, such as ADAME or MADAME, may, in particular, be carried out through an alkyl halide, such as a methyl halide, advantageously methyl chloride.

As examples of zwitterionic monomers, it is advantageous to use at least one monomer selected from:

sulfobetaine monomers such as sulfopropyl dimethylammonium ethyl methacrylate, sulfopropyl dimethylammonium propylmethacrylamide, sulfopropyl 2-vinylpyridinium;

phosphobetaine monomers, such as phosphate ethyl trimethylammonium ethyl methacrylate carboxybetaine monomers.

Generally speaking, the polymer may comprise between 0 and 50 mol %, more preferably between 0 and 30 mol % and even more preferably between 0 and 15 mol % of at least one monomer chosen from non-ionic monomers and/or anionic monomers and/or cationic monomers and/or zwitterionic monomers polymerizable with N-vinylformamide.

Preferably, the partially hydrolyzed N-vinylformamide polymer is a homopolymer of N-vinylformamide. Therefore, partial hydrolysis of the units derived from N-vinylformamide is performed on the N-vinylformamide homopolymer.

The inverse emulsion comprising at least one partially hydrolyzed N-vinylformamide polymer is composed of a hydrophilic phase comprising this polymer, a lipophilic phase, at least one emulsifying agent, and at least one inverting agent. Thus, it is a water-in-oil emulsion.

The lipophilic phase may be a mineral oil, a vegetable oil, a synthetic oil, or a mixture of several of these oils. Examples of mineral oil are mineral oils containing saturated hydrocarbons of the aliphatic, naphthenic, paraffinic, isoparaffinic, cycloparaffinic, or naphthyl type. Examples of synthetic oil are hydrogenated polydecene or hydrogenated polyisobutene, esters such as octyl stearate or butyl oleate. Thus, the Exxsol® product line from Exxon is a perfect fit.

In general, the weight ratio of the hydrophilic phase to the lipophilic phase in the inverse emulsion is preferably 50/50 to 90/10.

The inverse emulsion advantageously comprises from 12 to 26% by weight of oil and 35 to 48% by weight of water.

The term "emulsifying agent" denotes an agent capable of emulsifying water in oil, while an "inverting agent" is capable of emulsifying oil in water. Generally, an inverting agent is considered a surfactant having an HLB greater than or equal to 10, while an emulsifying agent is a surfactant having an HLB strictly less than 10.

The hydrophilic-lipophilic balance (HLB) of a chemical compound is a measure of its degree of hydrophilicity or lipophilicity, determined by calculating the values of different regions of the molecule, as described by Griffin in 1949 (Griffin W C, *Classification of Surface Active Agents by HLB*, Journal of the Society of Cosmetic Chemists, 1949, 1, pages 311-326).

Advantageously, the inverse emulsion contains an emulsifying agent. It may be advantageously selected from the following list: polyesters having a molecular weight of between 1,000 and 3,000, the products of condensation between a poly(isobutenyl) succinic acid or its anhydride and a polyethylene glycol, block copolymers having a molecular weight between 2500 and 3500, such as those sold under the names Hypermer®, sorbitan extracts, such as sorbitan monooleate or polyoleates, sorbitan isostearate or sorbitan sesquioleate, esters of polyethoxylated sorbitan, or even diethoxylated oleoketyl alcohol or tetra ethoxylated lauryl acrylate, condensation products of fatty alcohols higher than ethylene, like the reaction product of oleic alcohol with 2 ethylene oxide units; condensation products of alkylphenols and ethylene oxide, such as the reaction product of nonyl phenol with 4 units of ethylene oxide. Ethoxylated fatty amines such as Witcamide® 511, betaine products, and the ethoxylated amine are also good candidates as emulsifying agents.

The inverse emulsion advantageously comprises from 0.8 to 3% by weight of at least one emulsifying agent.

Advantageously, the inverse emulsion contains an inverting agent. It may be advantageously selected from the following list: ethoxylated sorbitan esters such as ethoxylated sorbitan oleate with 20 equivalents of ethylene oxide, polyethoxylated sorbitan laurate with 20 moles of ethylene oxide, polyethoxylated castor oil with 40 moles of ethylene oxide decaethoxylated oleodecyl alcohol, heptaethoxylated lauryl alcohol, octaethoxylated tridecyl alcohol or polyethoxylated sorbitan monostearate with 20 moles of ethylene oxide. The inverting agent may also be a polyoxyethylene alkylphenol; polyoxyethylene (10 moles) cetyl ether; polyoxyethylene alkyl aryl ether; quaternary ammonium derivatives; potassium oleate; N-cetyl-N-ethyl morpholinium ethosulfate; sodium lauryl sulfate; condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of fatty acid amines with greater than five or more ethylene oxide units; ethylene oxide tristerylphenol; ethylene oxide condensation products of higher partial fatty esters of a polyhydric alcohol and their internal anhydrides (e.g., mannitol anhydride and sorbitol anhydride); amine oxide; an alkyl polyglucoside; a glucamide; a phosphate ester or salt of alkylbenzenesulfonic acid; water-soluble polymeric surfactant.

The inverse emulsion advantageously comprises from 3 to 8% by weight of at least one emulsifying agent.

Preferably the inverse emulsion contains between 20 and 50% by weight of partially hydrolyzed N-vinylformamide polymer, even more preferably between 25 and 45% by weight.

The partially hydrolyzed N-vinylformamide polymer is derived directly from an acidic or basic hydrolysis reaction of the formamide functions when the N-vinylformamide polymer is in inverse emulsion form. The most commonly used basic and acidic hydrolysis agents are soda and phosphoric acid.

The person skilled in the art knows how to select the appropriate reaction conditions to achieve the required hydrolysis percentage.

For the process of the invention, advantageously between 10 and 60 mol %, more advantageously between 10 and 40 mol % of the N-vinylformamide functions of the polymer are hydrolyzed.

Preferably, the N-vinylformamide polymer partially hydrolyzed in the form of an inverse emulsion has a cationic charge density between 1.4 and 5.4 meq·g$^{-1}$.

As already mentioned, the hydrolysis may be done in an acidic or basic medium, advantageously in an aqueous solution.

When hydrolysis has been carried out in a basic medium, the aqueous phase of the inverse emulsion inevitably contains salts. As an example, for a hydrolysis in the presence of soda, the aqueous phase contains sodium formate.

Hydrolysis is performed on the polymer, i.e., after the polymerization of the monomers. The monomeric units resulting from the polymerization of N-vinylformamide ($CH_2$=$CH$—$NH$—$C$(=$O$)$H$) are of formula —$CH_2$—$CH$—$NH$—$C$(=$O$)$H$. Their hydrolysis makes forming vinylamine functions —$CH_2$—$CH$—$NH_2$ possible.

The aqueous phase may also contain other reaction agents commonly used during the hydrolysis reaction. In particular, these agents make it possible to control the cross-linking of the polymer during the hydrolysis reaction. These agents are commonly known as "anti-gelling agents." The aqueous phase of the inverse emulsion contains between 5,000 and 50,000 ppm of an anti-gelling agent, more preferably between 5,000 and 30,000 ppm, by weight based on the weight of the partially hydrolyzed N-vinylformamide polymer. In other words, the inverse emulsion has a weight ratio of partially hydrolyzed N-vinylformamide polymer to an anti-gelling agent of between 1,000,000/5,000 and 1,000,000/50,000, more preferably between 1,000,000/5,000 and 1,000,000/30,000.

The anti-gelling agent is an anti-freezing agent. This makes it possible to avoid a complete cross-linking of the polymer and thus the formation of an insoluble polymer in gel form.

The anti-gelling agent is advantageously selected from the group comprising alkali metal sulfites, alkaline earth metal sulfites, alkali metal hydrogen sulfites, alkaline earth metal hydrogen sulfites, alkali metal bisulfites hydroxylamine hydrochloride, hydroxylamine sulfate, alkali metal dithionite, alkaline earth metal dithionite, alkali metal borohydride, alkaline earth metal borohydride, alkali metal hydroxy methane sulfonate, alkaline earth metal hydroxy methane sulfonate, and mixtures thereof. The anti-gelling agent is preferably an alkali metal bisulfite, preferably sodium bisulfite. The alkali metal hydroxy methane sulfinate is advantageously rongalite, i.e., sodium hydroxy methane sulfinate. Cationic regain is the gain in cationicity between the theoretical and measured cationicity.

In practice, the cationicity measured in milliequivalents per gram of polymer (meq·g$^{-1}$) is determined by colorimetric titration of a 5 g·L$^{-1}$ polymer solution in water. The theoretical cationicity (in meq·g$^{-1}$) is determined by colorimetric titration of a 5 g·L$^{-1}$ solution in polymer water after a high shear rate (8,000 rpm$^{-1}$ for 10 minutes). Thus, the cationic regain is the gain in cationicity (in meq·g$^{-1}$) of the solution after shearing compared to the solution without shearing.

In particular, the cationic regain may be measured using any apparatus that allows shearing the polymer at 8,000 rpm, for example, a device of the IKA WERKE—ULTRA TURRAX T50 Basic disperser type.

According to the invention, the N-vinylformamide polymer partially hydrolyzed in the form of an inverse emulsion has a cationic regain of between 30 and 150%.

Preferably, for the process of the invention, the partially hydrolyzed N-vinylformamide polymer has a Brookfield viscosity greater than 1.2 cps at a concentration of 0.1% by weight in a 1M aqueous solution of NaCl, at 23° C., with a UL modulus and at 60 rpm$^{-1}$.

According to a preferred embodiment, the N-vinylformamide polymer partially hydrolyzed in the form of an inverse emulsion is introduced into the fiber suspension at a rate of 100 to 800 g·t$^{-1}$ of dry pulp. The N-vinylformamide polymer is partially hydrolyzed as an inverse emulsion and in the presence of an anti-gelling agent. Advantageously, it is added to the fibrous suspension in the form of an inverse emulsion, more advantageously, the inverse emulsion in which the hydrolysis is performed.

This retention agent may be used alone or in combination with a secondary retention agent. Preferably, in the process of the invention, a secondary retention agent selected from organic polymers and/or inorganic microparticles is added to the fibrous suspension.

This secondary agent added to the fibrous suspension is selected from anionic polymers in the broadest sense, which may therefore be (without being limiting) linear, branched, cross-linked, hydrophobic, associative, and/or inorganic microparticles (such as bentonite, colloidal silica).

Preferably, this secondary anionic retention agent is introduced into the fibrous suspension at a rate of 20 to 2500 g·t$^{-1}$ of dry pulp.

It should be noted that the order of introduction of the partially hydrolyzed N-vinylformamide polymer and the possible secondary retention agent, in a mixture or not, is to be optimized by the person skilled in the art on a case-by-case basis, according to each paper-making system.

The following examples illustrate the invention without limiting its scope.

EXAMPLES OF EMBODIMENTS OF THE INVENTION

Products Tested in the Examples:

The following products (Table 1) are polymers in the form of a water-in-oil inverse emulsion. The polymers in emulsions A to D (examples) and E to G (counter-examples) are partially hydrolyzed N-vinylformamide polymers. Emulsions H and I are anionic and amphoteric retention agents, respectively, used as secondary retention agents in combination with the above emulsions. All emulsions contain 34.5% by weight of the polymer. The weight ratio of the hydrophilic phase to the lipophilic phase is 72/28. The lyophilic phase is Exxsol D 100 (aliphatic hydrocarbons C12-C15).

TABLE 1

Drainage performance

| Emulsion | Charge Density (meq · g$^{-1}$) | UL Viscosity (cPs) | Cationic regain (%) | Hydrolyzed N-vinylformamide functions (mol %) | Amount of Na bisulfite | Vacuum drainage performance |
|---|---|---|---|---|---|---|
| A | 2.7 | 1.35 | 33% | 20 | 1% | Excellent |
| B | 2.7 | 1.35 | 115% | 20 | 2% | Excellent |
| C | 2.7 | 1.4 | 40% | 20 | 2% | Excellent |
| D | 5.4 | 1.35 | 96% | 40 | 2% | Excellent |
| E | 2.7 | 1.25 | 200% | 20 | 0% | Average |
| F | 2.7 | 1.8 | 13% | 20 | 10% | Average |
| G | 5.4 | 1.1 | 220% | 40 | 0% | Average |
| H | 5.4 | 2 | N/A | N/A | N/A | N/A |
| I | 1.35 | 3 | N/A | N/A | N/A | N/A |

The amount of anti-gelling agent (Na bisulfite) is expressed as a weight percentage, based on the weight of the partially hydrolyzed N-vinylformamide polymer (1%=10,000 ppm).

For emulsion H, the polymer is a copolymer of acrylamide and sodium acrylate (70/30% mol).

For Emulsion I, the polymer is a terpolymer of acrylamide, sodium acrylate, and dimethyl amino ethyl acrylate quaternized with methyl chloride (50/20/30 mol %).

UL viscosities are measured at a concentration of 0.1% by weight of the polymer in an aqueous solution with 1M NaCl, at 23° C., with a UL modulus, and at 60 rpm$^{-1}$.

Cationic regain is determined by colorimetric titration of a 5 g·L$^{-1}$ polymer solution after a shear rate of 8,000 rpm$^{-1}$ over 10 minutes.

Procedures Used in the Examples:
a) The Different Types of Pulps Used
Virgin Fiber Pulp (Used in Examples 1, 2, 3, 4, 5):

The wet paste is obtained by disintegrating the dry paste to obtain a final aqueous concentration of 1% by weight. It is a neutral pH pulp composed of 10% bleached virgin long fiber, 70% bleached virgin short fiber, and 20% mechanical fiber. This pulp also contains an additional 30% GCC (Hydrocal® 55 from Omya) in relation to the weight of the fibers (GCC being ground calcium carbonate).

Recycled Fiber Pulp (Used in Example 6):

The wet paste is obtained by disintegrating the dry paste to obtain a final aqueous concentration of 1% by weight. It is a pH-neutral pulp made from 100% recycled cardboard fibers.

b) Evaluation of Total Retention and Filler Retention

Different results are obtained using a "Britt Jar" type container with a stirring speed of 1,000 rpm.

The sequence for adding the different retention agents is as follows:

T=0 s: 500 ml of paste at 0.5% by mass is stirred
T=10 s: The cationic retention agent is added
T=20 s: The secondary cationic retention agent is added
T=30 s: The first 20 ml corresponding to the dead volume under the fabric is removed, then 100 mL of white water is recovered The First Pass Retention in percentage (% FPR: First Pass Retention), corresponding to the total retention, is calculated according to the following formula:

% FPR=$(C_{HB}C_{WW}/C_{HB})*100$

The first pass retention of ash in percentage (% FPAR: First Pass Ash Retention) is calculated using the following formula:

% FPAR=$(A_{HB}-A_{WW})/A_{HB}*100$

With:
$C_{HB}$: Headbox consistency
$C_{WW}$: White water consistency
$A_{HB}$: Consistency of the headbox ashes
$A_{WW}$: Consistency of the white water ashes c) Dynamic Drainage Analyzer (DDA)

The DDA (Dynamic Drainage Analyzer) automatically determines the time (in seconds) required to vacuum drain a fibrous suspension. The polymers are added to the wet paste (0.6 liter of paste at 1.0 wt %) in the DDA cylinder under agitation at 1,000 rpm:

T=0 s: pulp is stirred
T=10 s: cationic retention agent is added
T=20 s: secondary cationic retention agent is added
T=30 s: agitation and vacuum drainage at 200 mBar for 70 s ends The pressure under the fabric is recorded as a function of time. When all the water is evacuated from the fibrous mats, the air passes through it, causing a break to appear in the slope on the curve representing the pressure under the fabric as a function of time. The time, expressed in seconds, taken when the slope breaks, corresponds to the drain time. The shorter the time, the better the vacuum drainage.

Example 1: Influence of the Cationic Regain on Drainage Performance

TABLE 2

Influence of the cationic regain on drainage performance

| Emulsions | Blank | A | B | C | D | E | F | G |
|---|---|---|---|---|---|---|---|---|
| Cationic regain | N/A | 33% | 115% | 40% | 96% | 200% | 13% | 220% |
| DDA (750 g/T Dry Pulp) | 28.9 | 14.5 | 13.9 | 13.2 | 13.2 | 19.8 | 16.7 | 21.3 |

Drainage performance (Table 2) is better for partially hydrolyzed N-vinylformamide polymers with a cationic regain between 30 and 150%, whether for a charge density of 2.7 meq·g$^{-1}$ (emulsions A to C, E, and F) or 5.4 meq·g$^{-1}$ (emulsions D and G).

Example 2: Influence of Cationic Regain on Total Retention and Filler Retention

TABLE 3

Influence of cationic regain on retention

| Emulsions | Blank | A | B | C | E | F |
|---|---|---|---|---|---|---|
| Cationic regain | N/A | 33% | 115% | 40% | 200% | 13% |
| FPR (%) Retention | 61 | 78.2 | 77.8 | 78.49 | 65.5 | 71.4 |
| FPAR (%) Retention | 11 | 47 | 40 | 52 | 11 | 26 |

Total retention and filler retention (Table 3) are improved for partially hydrolyzed N-vinylformamide polymers with cationic regain of between 30 and 150% (emulsions A to C).

Example 3: Drainage Performance when N-Vinylformamide Polymer Partially Hydrolyzed in the Form of an Inverse Emulsion is Used in Combination with a Secondary Retention Agent

TABLE 4

Drainage performance

| Emulsions | Blank | C | C + H | C + I | D | D + H | D + I | E | E + H | E + I |
|---|---|---|---|---|---|---|---|---|---|---|
| DDA(s) | 28.9 | 13.2 | 12.1 | 12.3 | 13.2 | 11.5 | 11.8 | 18.8 | 16.5 | 14.3 |

For this example, the dosage for emulsions C, D, and E is 750 g/t dry pulp, and for the secondary retention agents (emulsions H and I) 150 g/t dry pulp (Table 4).

In combination, the drainage performance is better when the N-vinylformamide polymer in the form of an inverse emulsion has a cationic regain between 30 and 150%.

The invention claimed is:

1. A process for manufacturing a sheet of paper or cardboard, said process comprising, before said sheet is formed, adding at least one N-vinylformamide polymer, partially hydrolyzed in the form of an inverse emulsion in the presence of an anti-gelling agent, and having a cationic regain of between 30 and 150%, to a fibrous suspension at one or more injection points, the inverse emulsion having a partially hydrolyzed N-vinylformamide polymer/anti-gelling agent weight ratio of between 1,000,000/5,000 and 1,000,000/50,000,
    wherein the anti-gelling agent is sodium bisulfite, and
    wherein the cationic regain is the gain in cationicity between the theoretical and measured cationicity,
the theoretical cationicity, in meq·g$^{-1}$, being determined by colorimetric titration of a 5 g·L$^{-1}$ solution of polymer in water after a high shear rate of 8,000 rpm for 10 minutes, the measured cationicity, in meq·g$^{-1}$, being determined by colorimetric titration of a 5 g·L$^{-1}$ solution of polymer in water.

2. The process according to claim 1, wherein the inverse emulsion contains between 20 and 50% by weight of partially hydrolyzed N-vinylformamide polymer.

3. The process according to claim 1, wherein the N-vinylformamide polymer partially hydrolyzed in the form of an inverse emulsion has a cationic charge density between 1.4 and 5.4 meq·g$^{-1}$.

4. The process according to claim 1, wherein the partially hydrolyzed N-vinylformamide polymer has a Brookfield viscosity greater than 1.2 cps at a concentration of 0.1% by weight in a 1M aqueous solution of NaCl, at 23° C., with a UL modulus and at 60 rpm$^{-1}$.

5. The process according to claim 1, wherein the N-vinylformamide polymer partially hydrolyzed in the form of an inverse emulsion is introduced into the fibrous suspension at a rate of 100 to 800 g·t$^{-1}$ of dry pulp.

6. The process according to claim 1, wherein a secondary retention agent selected from organic polymers and/or inorganic microparticles is added to the fibrous suspension.

7. The process according to claim 1, wherein a secondary anionic retention agent is added to the fibrous suspension at a rate of 20 to 2500 g·t$^{-1}$ of dry pulp.

8. The process according to claim 1, wherein the partially hydrolyzed N-vinylformamide polymer is in the form of a water-in-oil inverse emulsion comprising 12 to 26% by weight of oil and 35 to 48% by weight of water.

9. The process according to claim 1, wherein the partially hydrolyzed N-vinylformamide polymer comprises N-vinylformamide functions of which 10 to 60 mol % are hydrolyzed.

10. The process according to claim 1, wherein the partially hydrolyzed N-vinylformamide polymer comprises between 0 and 50 mol % of at least one monomer selected from the group consisting of non-ionic monomers, anionic monomers, cationic monomers, zwitterionic monomers, and mixtures thereof.

11. The process according to claim 1, wherein the N-vinylformamide polymer partially hydrolyzed in the form of an inverse emulsion is a partially hydrolyzed N-vinylformamide homopolymer.

12. The process according to claim 1, wherein the partially hydrolyzed N-vinylformamide polymer is a partially hydrolyzed N-vinylformamide homopolymer in which 10 to 60 mol % of the N-vinylformamide functions are hydrolyzed.

13. The process according to claim 1, wherein the inverse emulsion has a partially hydrolyzed N-vinylformamide polymer/anti-gelling agent weight ratio of between 1,000,000/5,000 and 1,000,000/30,000.

14. The process according to claim 2, wherein the N-vinylformamide polymer partially hydrolyzed in the form of an inverse emulsion has a cationic charge density between 1.4 and 5.4 meq·g$^{-1}$.

15. The process according to claim 14, wherein the partially hydrolyzed N-vinylformamide polymer has a Brookfield viscosity greater than 1.2 cps at a concentration of 0.1% by weight in a 1M aqueous solution of NaCl, at 23° C., with a UL modulus and at 60 rpm$^{-1}$.

16. The process according to claim 15, wherein:
    the partially hydrolyzed N-vinylformamide polymer is in the form of a water-in-oil inverse emulsion comprising 12 to 26% by weight of oil and 35 to 48% by weight of water; and
    the partially hydrolyzed N-vinylformamide polymer comprises N-vinylformamide functions of which 10 to 60 mol % are hydrolyzed.

17. The process according to claim 6, wherein the secondary anionic retention agent is added to the fibrous suspension at a rate of 20 to 2500 g·t$^{-1}$ of dry pulp.

18. The process according to claim 9, wherein the partially hydrolyzed N-vinylformamide polymer comprises N-vinylformamide functions of which 10 to 40 mol % are hydrolyzed.

\* \* \* \* \*